United States Patent

[11] 3,600,650

| [72] | Inventors | Robert E. Obenhaus<br>South Easton;<br>Lyle E. McBride, Jr., Norton, both of, Mass. |
|---|---|---|
| [21] | Appl. No. | 787,640 |
| [22] | Filed | Dec. 30, 1968 |
| [45] | Patented | Aug. 17, 1971 |
| [73] | Assignee | Texas Instruments Incorporated<br>Dallas, Tex. |

[54] PROTECTED SEMICONDUCTOR DEVICE HAVING SENSOR THERMALLY COUPLED TO ELECTRODE
5 Claims, 6 Drawing Figs.

[52] U.S. Cl.................................................. 317/235 R,
    317/235 Q, 317/235 AB, 317/234 A, 318/332, 338/22
[51] Int. Cl........................................................ H01l 11/00, H01l 15/00
[50] Field of Search........................................... 317/234, 235, 29, 13, 41; 338/22, 23, 24; 318/332; 250/214

[56] References Cited
UNITED STATES PATENTS

| 3,392,284 | 7/1968 | Cain ............................. | 250/214 |
|---|---|---|---|
| 3,406,366 | 10/1968 | Kontrimas et al............. | 317/234 |
| 3,431,392 | 3/1969 | Garland et al. ................ | 317/235 |
| 3,443,188 | 5/1969 | Mortimer...................... | 318/332 |
| 3,444,399 | 5/1969 | Jones............................. | 317/235 |
| 3,453,887 | 7/1969 | Wooten......................... | 317/234 |
| 3,017,520 | 1/1962 | Maupin ........................ | 317/235 |
| 3,182,201 | 5/1965 | Sklar............................. | 317/235 |

Primary Examiner—John W. Huckert
Assistant Examiner—Andrew J. James
Attorneys—Harold Levine, Edward J. Connors, Jr., John A. Haug and James P. McAndrews ABSTRACT: A semiconductor device has a sensor of thermistor material in thermally conductive contact with an electrode of the device at a surface common to the electrode and the sensor for intimate thermal sensing of the temperature of the electrode. Because of its small mass and intimate contact with the electrode, the sensor has a rapid thermal response (small time constant) relative to the rate of change of the device temperature so that the temperature of the sensor will essentially follow the temperature of the electrode without significant thermal lag. In a method of sensing the temperature of the device the sensor of thermistor material is placed in thermally conductive contact with the electrode of the device and the resistance thereof is sensed as a predetermined function of the temperature of the sensor. At a preselected temperature of the sensor the current flowing through the device is protectively reduced.

Robert E. Obenhaus,
Lyle E. McBride, Jr.,
Inventors

PROTECTED SEMICONDUCTOR DEVICE HAVING SENSOR THERMALLY COUPLED TO ELECTRODE

BACKGROUND OF THE INVENTION

This invention relates to a thermally protected semiconductor device and to methods of protecting such a device, and more particularly to such a device having a sensor in thermally conductive contact with an electrode of the device to sense the temperature of the electrode and to methods of protecting the device involving measuring the resistance of the sensor as a function of its temperature and protectively reducing the current flowing through the device at a preselected temperature of the sensor.

Semiconductor current switching devices have gained wide acceptance across the entire spectrum of electronics applications. However, a serious problem with these devices has been their propensity toward rapid thermal destruction if their current ratings are exceeded for even a short time. Heat is produced in such devices from current passing through the electrodes as a result of heating at the junctions of the device and ohmic heating in the materials and connections themselves. In a thermal overload, the heat produced greatly exceeds the thermal dissipation provided. Since the devices have relatively small mass, the temperature of the electrodes increases so rapidly as to cause, for example, melting of solder connections or, in the case of extreme heat, melting, shattering or cracking of the silicon substrate or slice.

A number of schemes have been proposed or practiced in attempts to protect against thermal destruction of such current switching devices. For example, a fuse or thermal overload device has been connected in the load circuit so that the fuse will blow or the thermal overload device will trip in the event that the load current is too high. Another arrangement has been the incorporation of a thermal protective device within the housing or case of the current switching device, as by incorporating a fuse in the device such that the overheating of the device will, in due course, cause the fuse to melt. A similar approach has been the incorporation of a thermally responsive bimetal spring within the case of the device. Each of these approaches has not been an acceptable solution of the overload heating problem because the thermal lag between the initiation of the overload and the operation of the protective mechanism has been so great as to permit thermal destruction of the device on massive overloads. Another approach has been the measurement of the load current or the gate current triggering level by an electronic sensing circuit which will quickly interrupt the current through the device by opening the load circuit or removing the triggering current should an overload condition be reached. However, this approach is too elaborate and expensive to be fully practical or useful in all cases. Yet another proposal has been to directly measure the temperature of a separate "artificial" semiconductor junction which is biased to simulate the performance of other nearby semiconductor devices in circuit thereby to operate a protective circuit. However, this provides no certainty of protection since the temperature of the simulated junction may or may not be the same as other devices in the circuit. This approach fails where it is required to sense a sudden temperature increase of any device other than the "artificial" device or to monitor the performance of a particular device.

Accordingly, among the several objects of the present invention may be noted the provision of a thermally protected semiconductor device having a sensor in thermally conductive contact with an electrode of the device for intimate thermal protective sensing of the temperature of the electrode and methods of measuring the resistance of the sensor for protecting the device; the provision of such a device without significant thermal lag; the provision of such a device and methods in which the resistance of the sensor can be sensed as a predetermined function of the temperature of the sensor for protectively reducing the current flowing through the electrodes of the device at a preselected temperature of the sensor; the provision of such a device and methods which permit extremely simple self-protection of the device; and the provision of such a device and methods which are reliable, simple and inexpensive. Other objects and features will be in part apparent and in part pointed out hereinafter.

Briefly, a thermally protected semiconductor device of this invention has electrodes and includes a sensor of thermistor material in thermally conductive contact with an electrode of the device at a surface common to the electrode and the sensor for intimate thermal sensing of the temperature of the electrode. The sensor has a time constant small enough that the temperature of the sensor will essentially follow without significant thermal lag the temperature of the device. The sensor has terminals for connection to a circuit for sensing the resistance of the sensor as a function of its temperature to protect the device against thermal damage by reducing the current flowing through the electrodes. In a method of sensing the temperature of the device, the sensor of thermistor material is placed in thermally conductive contact with an electrode for intimate thermal sensing thereof, the sensor being of a time constant small enough that the temperature of the sensor will essentially follow without significant thermal lag the temperature of the electrode and thereby the temperature of a junction of the device, sensing the resistance of the sensor as a predetermined function of its temperature, and protectively reducing the current flowing across the junction at a preselected temperature of the sensor.

The invention accordingly comprises the constructions and methods hereinafter described, the scope of the invention being indicated in the following claims.

In the accompanying drawings, in which several of various possible embodiments of the invention are illustrated, FIG. 1 is a perspective view of structural elements of a thermally protected semiconductor device of this invention;

Figure 5:
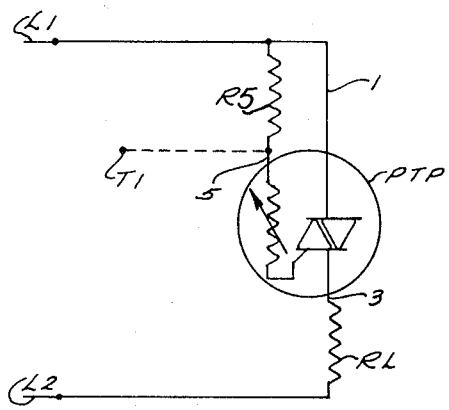
Figure 6:
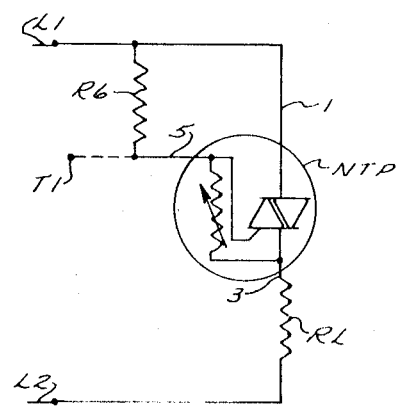

FIG. 5 is a schematic circuit diagram of a thermally protected semiconductor device of this invention connected for self-protection and employing one type of thermistor material for the sensor thereof; and FIG. 6 is a schematic circuit diagram of a thermally protected semiconductor device of this invention connected for self-protection and employing a different kind of thermistor material for the sensor thereof.

Corresponding reference characters indicate corresponding parts throughout the several views of the drawings.

Figure 1:
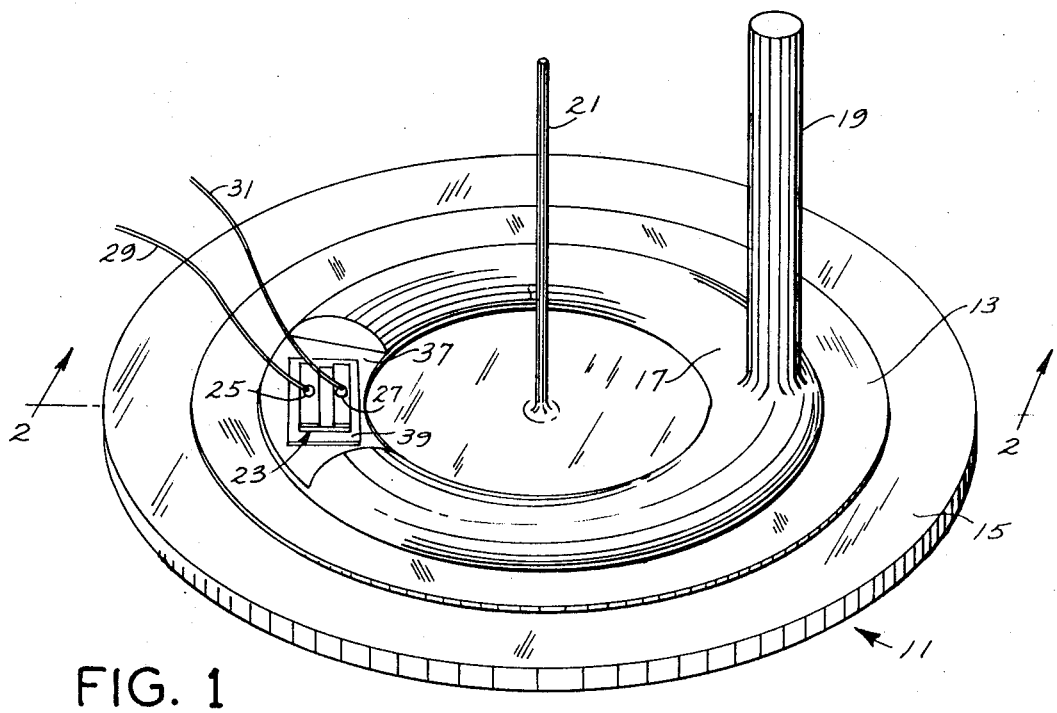

Referring now to FIG. 1, there is illustrated a thermally protected semiconductor device of the invention, indicated generally at 11. The device illustratively comprises the elements of a triac. As is known to those skilled in the art, a triac is a member of the family of bistable semiconductor devices which have a plurality of semiconductor layers of p- or n-type material with one or more junctions therebetween and which may be switched between conductive and nonconductive states. This family also includes the well-known silicon controlled rectifier, or SCR, as well as similar devices known by other names, such as, for example, the silicon controlled switch. The device includes a conventional silicon slice or wafer 13 comprised of silicon doped with impurities to provide a plurality of alternating p-type or n-type active layers with junctions therebetween (not shown). Wafer 13 is mounted on a silver disc 15 comprising a main electrode of the device. On the opposite side of wafer 13, a solder ring 17 resembling a transverse section of a torus constitutes the other main electrode of the device. As is also conventional, the solder ring electrode 17 may be constituted by a flat metal ring of silver, for example. Attached to the solder ring 17 is the usual lead 19 which projects from the case of the finished device to provide a main terminal, the case usually having a stud projecting from its bottom surface to provide the other main terminal. A gate lead 21 provides access to one of the active layers for triggering of the device and similarly projects from the case of the finished device to provide a gate terminal.

In accordance with the invention, a sensor 23 of thermistor material is placed in thermally conductive contact with ring electrode 17 at a surface common to the electrode and the sensor for intimate thermal sensing of the temperature of the electrode. This temperature varies according to heat generated in the device by current flowing between the main electrodes 15 and 17 and thereby across the junctions of wafer 13.

The time constant of sensor 23 is small enough that the temperature of the sensor will essentially follow variations in the temperature of the electrode without significant thermal lag. The sensor has a pair of terminal connections 25 and 27 for a pair of leads 29 and 31 which permit connection of the sensor in a circuit which is responsive to the resistance of the sensor as a function of its temperature to protectively reduce the current flowing through the main terminals of the device at a preselected temperature of the sensor which corresponds to a maximum permissible temperature of electrode 17.

Figure 3:
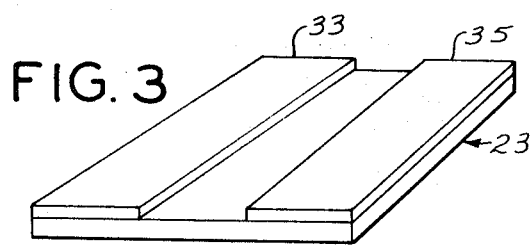
FIG. 3 is an enlarged perspective view of the sensor employed in the thermally protected semiconductor device shown in FIG. 1.

Sensor 23, as is illustrated with greater clarity in FIG. 3, comprises a rectangular chip of a thermistor material such as barium titanate which is doped, e.g., with lanthanum, so that it has a positive temperature coefficient (PTC) resistance characteristic with a temperature-resistance anomaly. The sensor may likewise be constructed from a material exhibiting a negative temperature coefficient (NTC) of resistivity. In either case, the material preferably has a transition temperature at which the resistance of the material changes relatively abruptly. The transition temperature at which the resistance of the sensor changes relatively abruptly is chosen substantially at the preselected temperature of the sensor which corresponds with the maximum permissible temperature of the device. Sensor 23 has a pair of metallized areas 33 and 35 which may, for example, be provided by vapor deposition techniques. The metallized areas 33 and 35 provide ohmic contact areas to which the leads 29 and 31 are readily soldered or ball-bonded as shown at 25 and 27.

Figure 2:
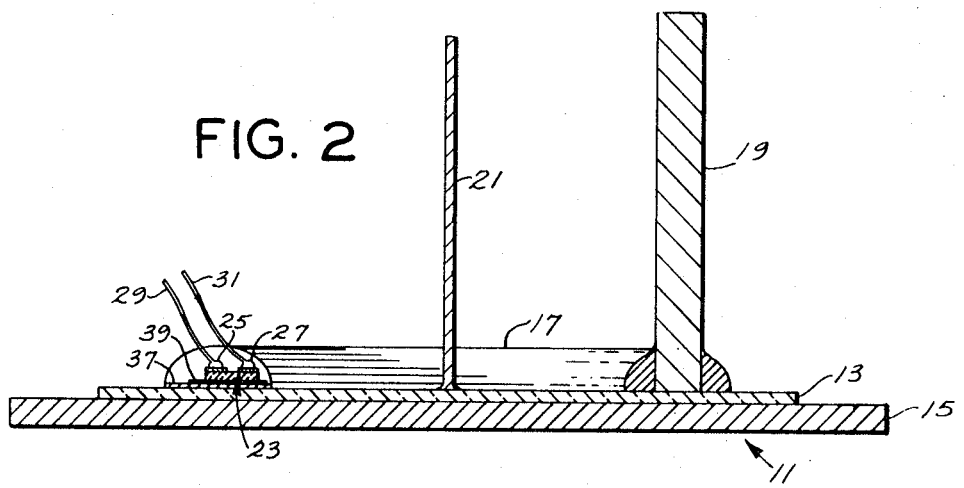
FIG. 2 is a cross section taken on line 2–2 of FIG. 1 and illustrating further details in the construction of a thermally protected semiconductor device of the invention.

As is illustrated by FIG. 2, the layer of thermistor material comprising sensor 23 is relatively thin in relation to electrode 17 to insure that it will essentially follow without significant thermal lag the temperature of electrode 17. Exemplary dimensions of a sensor which have been found suitable for thermal protection of a 25-ampere triac are a square dimension of 50 mils and a thickness of 15 mils. A sensor of such dimensions may be constructed, for example, by slicing a larger sheet of thermistor material of the requisite thinness into squares of appropriate dimensions. Or the sensor may be applied to the electrode by known thick-film techniques.

To receive sensor 23, electrode 17 is provided with a small flat 37 or other surface conforming to the sensor so that there is good thermal conductivity between the electrode and the sensor. The surface common to the sensor and the electrode is, for example, constituted by a thin film 39 of thermally conductive electrically insulating material. A material well suited for this purpose is a polyamide polymeric material known as H-film, which desirably resists melting at high temperatures while retaining good electrical insulating properties. Sensor 23 and film 39 are suitably secured as by a coating of silicone varnish.

Figure 4:
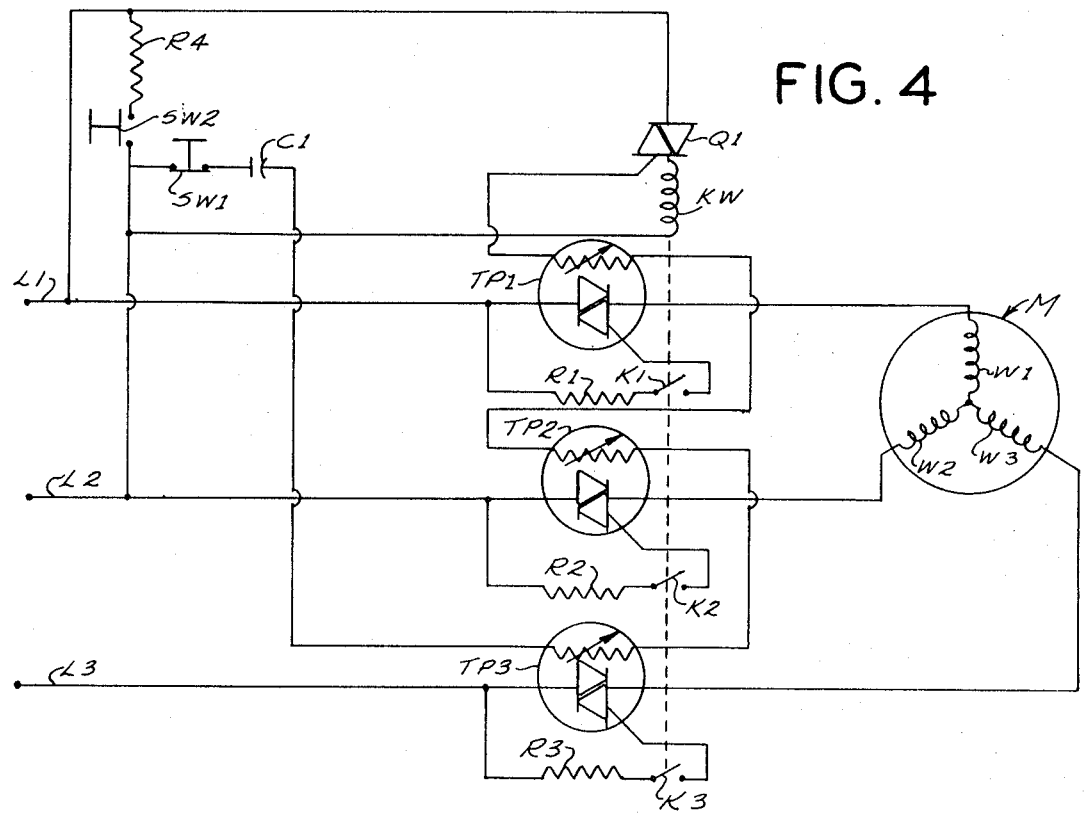
FIG. 4 is a schematic circuit diagram showing three thermally protected semiconductor devices of the invention connected for switching of the three phase connections of a load to a power supply and means responsive to the resistance of the sensor of any one of the devices for protectively reducing the current through all of the devices if one should overheat.

In FIG. 4 there is illustrated a circuit employing three thermally protected semiconductor switching devices of this invention connected for supplying power to the individual phase windings W1, W2 and W3 of a conventional three-phase motor M. The devices, designated TP1, TP2 and TP3, provide semiconductor switching of the current to the motor, detection of an overload condition in any of the three windings, and locked rotor protection for the motor. Each thermally protected device comprises a triac having main terminals and a gate terminal and a sensor provided, in accordance with this invention, in thermally conductive relationship with an electrode of the triac. The sensor is of a thermistor material exhibiting a positive temperature coefficient resistance characteristic having a transition temperature above which its resistance rises relatively abruptly. The main terminals of each of the thermally protected devices TP1, TP2 and TP3 is connected in series with a corresponding one of the windings W1, W2 and W3 to supply the windings with power from a conventional three-phase connection made by means of power supply leads L1, L2 and L3. The sensors are connected in series in a circuit which is responsive to the resistance of the sensors as a function of their temperatures to protect both the motor and devices TP1, TP2 and TP3 against thermal damage by causing the thermally protected devices to be switched to their nonconductive states. This circuit includes a contactor including a contactor winding KW and contacts K1, K2 and K3 which are closed by energization of winding KW. Each of the contacts K1, K2 and K3 is connected in a corresponding gate triggering circuit for each of the devices TP1, TP2 and TP3. Each of these triggering circuits includes a respective resistor R1, R2 and R3 connected in series with a corresponding one of the contacts K1, K2 and K3 between the gate of the device and a corresponding one of the power leads L1, L2 and L3 to supply triggering current to the gate terminal of each device when the contacts close. Winding KW of the contactor is connected in series with the main terminals of a triac Q1 across supply leads L1 and L2. A triggering circuit for triac Q1 comprises a capacitor C1, one side of which is connected through a normally closed switch SW1 to supply lead L2, and the series-connected trio of individual sensors of the thermally protected devices TP1, TP2 and TP3, connected between the other side of the capacitor and the gate terminal of triac Q1. The triggering circuit further comprises a resistor R4 and a normally open switch SW2 which are connected between leads L1 and L2 of the supply.

In the operation of the FIG. 4 circuit, it is first assumed that triac Q1 is in its nonconductive state and that, accordingly, winding KW is deenergized such that contacts K1, K2 and K3 are open and thus each of the triac sections of the thermally protected devices TP1, TP2 and TP3 is in its nonconductive state. Therefore no current is supplied to windings W1, W2 and W3 of the motor. Since no current flows through the main terminals of the devices, the sensors therein are each in a relative cool or low temperature state so that each exhibits a relatively low resistance by virtue of its positive temperature coefficient. Accordingly, the series-connected trio of sensors represents a low resistance path between capacitor C1 and the gate terminal of triac Q1.

For operation of the circuit to supply power to the windings W1, W2 and W3, switch SW2 is momentarily depressed. This closes the circuit from lead L1 through resistor R4, switch SW1, capacitor C1 and the three sensors of the three thermally protected devices TP1, TP2 and TP3 to supply triggering current from lead L1 to the gate terminal of triac Q1. This causes triac Q1 to become conductive thereby to energize winding KW of the contactor and thus close contacts K1, K2 and K3. After switch SW2 is released so that it reopens, triac Q1 remains conductive since the winding KW and capacitor C1 cause a phase shift so that the current applied to triac Q1 is of a phase angle to cause the triac to be triggered on each a.c. half cycle. Triac Q1 accordingly remains in its conductive state until switch SW1 is momentarily opened to open the triggering circuit. When contacts K1, K2 and K3 close upon energization of winding KW, a triggering signal is applied to the gate terminal of each of the thermally protected devices TP1, TP2 and TP3 through its corresponding resistor R1, R2 and R3 causing the devices to become conductive and thereby to supply power to windings W1, W2 and W3.

Should the current in one of the windings become excessive, the thermally protected device connected for supplying power to that winding will thus become heated because of the excessive current flowing through its electrodes. This causes the sensor of the device to become heated. When the sensor reaches its transition temperature, its resistance rises relatively abruptly. This high resistance in the triggering circuit of triac Q1 reduces the triggering current supplied to the gate terminal to a value which is insufficient to trigger triac Q1 reduces the triggering current supplied to the gate terminal to a value which is insufficient to trigger triac Q1, which then becomes nonconductive. When this occurs, winding KW is deenergized and the contacts K1, K2 and K3 therefore simultaneously open to remove the triggering signal applied to the gate terminals of each of the protected devices TP1, TP2 and TP3. Accordingly, each of the devices becomes nonconductive to switch off the current applied to the three windings W1, W2 and W3.

Similarly, if the motor should experience a locked rotor condition, the very high current drawn by each of the phase windings will cause rapid heating of the triacs, thereby threatening the triacs or the windings with thermal damage. However, each of the sensors of the protected devices follows the temperature of the electrode with which it is in thermally conductive relationship without significant thermal lag. Thus when the resistance of any one or all of the sensors of the protected devices exceeds the preselected transition temperature, the triggering current supplied to the gate terminal triac Q1 is reduced to cause triac Q1 to become nonconductive and thereby to open the contacts K1, K2 and K3. This removes the triggering signal applied to the gate terminals of each of the protected devices causing them to become nonconductive and thereby protecting both the devices and the windings from thermal damage.

While the circuit of FIG. 4 illustrates the method of using a plurality of thermally protected devices of this invention for controlling motor windings, it will be understood that such thermally protected devices may be used in conjunction with other types of power loads or devices and in various other applications.

FIG. 5 illustrates an application of a thermally protected device of this invention in a simple self protective circuit. The device is designated PTP. The circuit includes a load, represented as a resistor RL, connected in series with the main terminals 1 and 3 of the protected triac device across the leads L1 and L2 of a conventional a.c. supply. The sensor of the device comprises a PTC thermistor material having a predetermined transition temperature above which its resistance rises relatively abruptly. The sensor is connected in series with the gate internally of the case of the device so that there is provided a single triggering terminal 5. It is to be understood that separate external terminals for the sensor and the gate of the device could be provided to permit the user to make external connection of the sensor to the gate or to other circuits. A circuit for applying a triggering current to the device therefore comprises the sensor of the device connected in series with an external resistor R5 between the gate terminal of the protected device and supply lead L1. A separate terminal T1 may be provided for controlling the protected device by a triggering current supplied by an external triggering circuit, in which case resistor R5 would not be present.

In the operation of this circuit, when leads L1 and L2 are connected to the supply voltage, a triggering signal is applied through resistance R5 and the sensor to the gate terminal of the device, thereby causing it to become conductive. As long as the circuit operates normally, i.e., as long as the current passing through the device remains below a rated maximum corresponding to a maximum permissible temperature of the device with which the sensor is in thermally conductive relationship, the temperature of the sensor will remain below its transition temperature. Triggering current will continue to be supplied to the gate terminal of the device. However, should an overload condition occur, as where the resistance RL becomes quite low as a result of a short or other failure, then current flowing through the device will cause it to become heated, thereby heating the sensor, When the temperature of the sensor rises above its predetermined transition temperature, its resistance rises relatively abruptly to reduce the triggering current applied to the gate below the value required to trigger the device during each half cycle of the AC supply voltage. When the sensor cools below its transition temperature, sufficient triggering current will again be applied to the gate of the device to cause it to become conductive, reenergizing the load. If the load resistance RL remains so low that there remains an overload condition, the sensor will again follow the temperature of the device as it heats until the sensor is heated above its transition temperature once more to cause the device to become nonconductive. If desired, the device may be used in conjunction with a trip circuit (such as shown in FIG. 4) so that the device will remain nonconductive after the sensor has caused it to become nonconductive.

FIG. 6 illustrates a thermally protected device of the invention wherein the sensor is of NTC thermistor material having a predetermined transition temperature above which its resistance falls relatively abruptly. This device, designated NTP, is connected with its main terminals 1 and 3 in series with a load represented by resistor RL across the leads L1 and L2 in the same fashion as the circuit shown in FIG. 5. The sensor of the device is connected internally of the case of the device between its gate and the adjacent main terminal 3, and a gate terminal 5 provides means for triggering the device. As with the device shown in the circuit of FIG. 5, separate external terminals could be provided for the sensor and the gate. Terminal 5 is connected through a resistor R6 to supply lead L1 to provide a self-triggering circuit for the device. A circuit for applying a triggering signal to the gate of the device comprises a resistor R6 connected between lead L1 and the gate terminal. The sensor of the device is connected between the gate terminal and the adjacent main terminal of the device. As in the circuit of FIG. 5, a terminal T1 may provide means for connecting the device to an external triggering circuit which would take the place of resistor R6.

The circuit operates analogously to the circuit of FIG. 5. When the leads L1 and L2 are connected to the AC source, triggering current is applied through resistor R6 to the gate terminal to cause the device to become conductive and thereby supply current to the load. As long as no overload condition is present, the sensor will be relatively cool and will exhibit a high resistance so that the device will remain conductive. Should an overload condition occur, the sensor will be heated with the electrode of the device with which it is in thermally conductive relationship. When the sensor is heated to its transition temperature, its resistance drops relatively abruptly at the transition temperature to cause the triggering current applied through R6 to be shunted away or diverted from the gate terminal and thereby to cause the device to become nonconductive, thus providing for thermal protection of both the device and the load. When the sensor cools, triggering current is again applied to the gate terminal to cause the device to become conductive and reenergize the load.

While a thermally protected device of this invention has been shown and described as a thermally protected triac for the purpose of clearly describing the device and methods of this invention, it is to be understood that such a thermally protected device may comprise other semiconductor devices, such as diodes and transistors, for which it is desirable to provide thermal protection. It is also understood that the resistance of the sensor may be measured for the purpose of characterizing of testing the behavior of the semiconductor device with respect to rapid temperature changes.

In view of the above, it will be seen that the several objects of the invention are achieved and other advantageous results attained.

As various changes could be made in the above constructions and methods without departing from the gist of the invention, it is intended that all matter contained in the above description or shown in the accompanying drawings shall be interpreted as illustrative.

We claim:

1. A thermally protected semiconductor device comprising a p-n junction semiconductor having first and second main electrodes, a sensor of thermistor material in thermally conductive contact with said first electrode at a surface common to said first electrode and the sensor for intimate thermal sensing of the temperature of the electrode, said sensor being insulated from said first electrode by a film of thermally conductive electrically insulating material at the surface common to the sensor and the electrode the temperature of the electrode varying according to heat generated in the device by current flowing between the electrodes, the sensor having a sufficiently small time constant that the temperature of the sensor will essentially follow without significant thermal lag the temperature of the electrode, the sensor comprising a layer of thermistor material which is relatively thin in relation to the area in contact with the electrode and having terminals, said terminals connected to circuit means responsive to the resistance of the sensor as a function of the temperature thereof to protect the device against thermal damage by reducing said current flow.

2. A thermally protected semiconductor device as set forth in claim 1 wherein said thermistor material has a resistance characteristic having a transition temperature at which the resistance of the material changes relatively abruptly.

3. A thermally protected semiconductor device as set forth in claim 1 which includes a gate terminal and wherein said sensor has one terminal thereof connected to said gate terminal.

4. A thermally protected semiconductor device as set forth in claim 3 wherein said sensor is of PTC thermistor material and the terminals of the sensor are connected in a series circuit with the gate terminal for controlling the flow of current thereto.

5. A thermally protected semiconductor device as set forth in claim 4 wherein said sensor is of NTC thermistor material and the terminals of the sensor are connected in a circuit for diverting the flow of current from said gate terminal.